(12) United States Patent
Wakao et al.

(10) Patent No.: US 6,396,791 B1
(45) Date of Patent: May 28, 2002

(54) OPTICAL PICK-UP APPARATUS

(75) Inventors: Sadayuki Wakao; Kozo Matsumoto, both of Asaba-cho (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/469,271

(22) Filed: Dec. 22, 1999

(30) Foreign Application Priority Data

Mar. 16, 1999 (JP) ............................................ 11-070137

(51) Int. Cl.[7] ................................................ G11B 7/00
(52) U.S. Cl. ............................ 369/112.29; 369/112.21; 369/94
(58) Field of Search ...................... 369/112.29, 112.28, 369/112.21, 94, 44.23, 44.37, 112.23, 112.24, 112.25, 112.26, 112.14, 112.13

(56) References Cited

U.S. PATENT DOCUMENTS

| | | | | |
|---|---|---|---|---|
| 5,671,207 A | * | 9/1997 | Park | 369/44.23 |
| 6,034,797 A | * | 3/2000 | Ju et al. | 369/44.37 |
| 6,069,862 A | * | 5/2000 | Fujita et al. | 369/112.19 |
| 6,081,498 A | * | 6/2000 | Yoo et al. | 369/112.21 |
| 6,084,841 A | * | 7/2000 | Sugiura et al. | 369/112.21 |
| 6,084,842 A | * | 7/2000 | Miura | 369/112.29 |

* cited by examiner

Primary Examiner—Thang V. Tran
(74) Attorney, Agent, or Firm—Oliff & Berridge, PLC

(57) ABSTRACT

In order to condense the light beam on the second optical disc 1b, the opening limiting portion 20 for limiting the beam diameter is disposed between the condenser lens 14 for condensing the light beam on the first optical disc 1a and the light sources 2 and 8, so that the light beam is condensed most suitably with the condenser lens 14 when the first optical disc 1a is read. On the other hand, when the second optical disc is read, by the opening limiting portion 20 which limits the beam diameter, even if it is the light beam which corresponds to the second optical disc 1b, it is condensed most suitably with the condenser lens 14. Further, by changing the beam diffusion angle, the generation of the wave front aberration is restrained.

8 Claims, 11 Drawing Sheets

Graph showing wavelength-transmissivity property of wavelength filter film

F I G.5 (a)
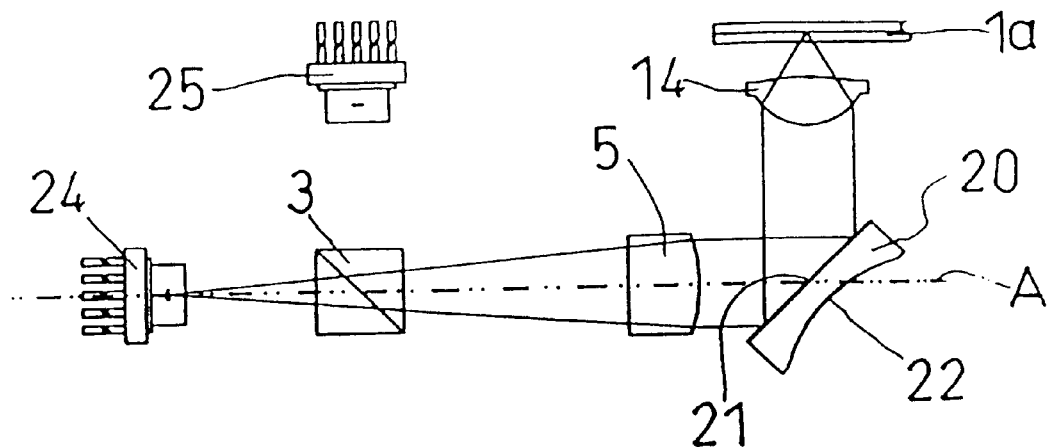
F I G.5 (b)
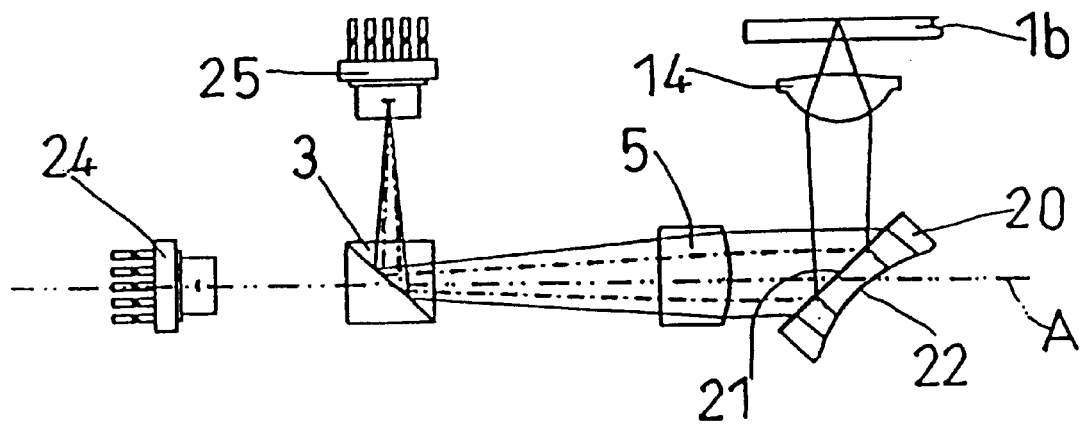

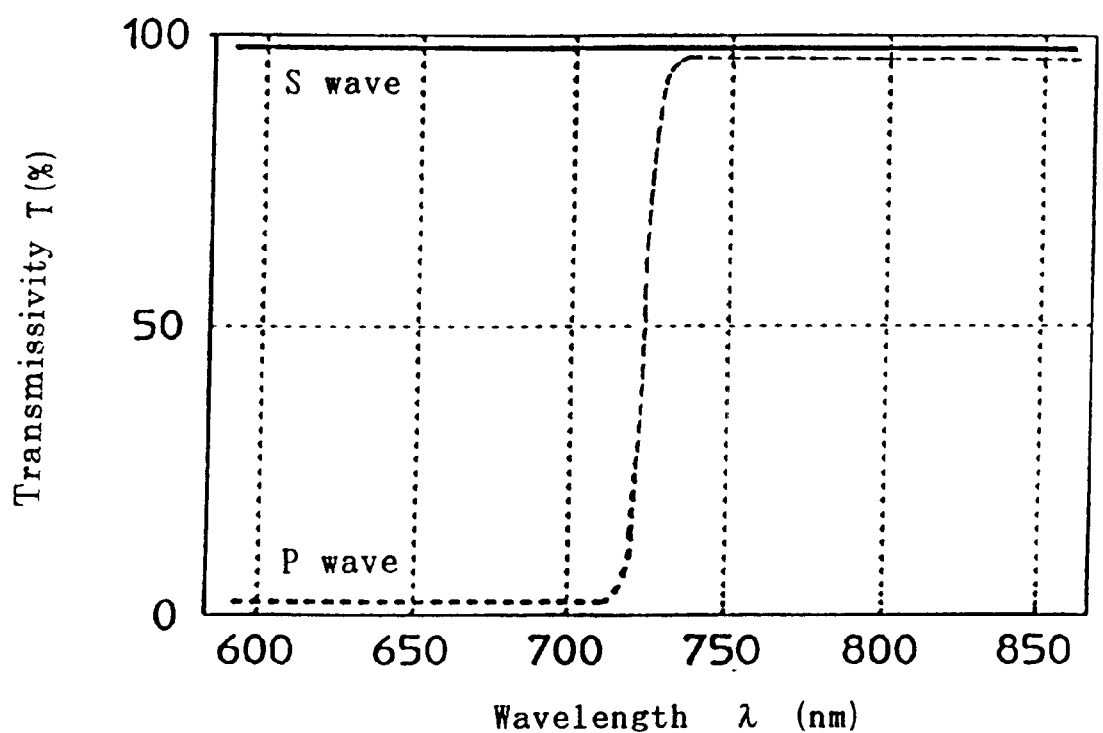

OPTICAL PICK-UP APPARATUS

BACKGROUND OF THE INVENTION

1. Field of the Invention

The present invention relates to an optical pick-up apparatus for recording and reading an optical disc, which is different in an substrate thickness and a wavelength to be used.

2. Description of the Prior Art

Conventionally, in an optical disc being used at present, there are variations such as a CD, a CD-ROM and a DVD, and higher density optical disc has been developed. These informations to be recorded on optical discs have been recorded with a bit on the recording surface of an optical disc by forming a pit or a mark corresponding to the pit, it is adapted to determine the existence if any information by illuminating a light beam on the surface recorded with information and detecting the reflected light beam strength.

According to the kind of an optical disc, there is a difference in the pit shape or the shape of mark corresponding to the pit, recording system and the thickness of the substrate, in the case where reading of different kinds of discs is carried out, a light beam in accordance with the wavelength due to the kind of disc has to be illuminated. For example, to a CD and a CD-ROM (hereinafter referred to "standard density optical disc") having the substrate thickness of 1.2 mm, a light source to emit a light beam having a wavelength of 780 nm band should be applied, and to a DVD (hereinafter, referred to "high density optical disc) having the substrate thickness of 0.6 mm, a light source to emit a light beam having a wavelength of 635–650 nm band should be applied.

For that purpose, in order to read different kinds of optical discs with a single optical pick-up apparatus, such pick-up apparatus comprises light sources having different wavelengths corresponding to each optical disc and an objective lens to condense a light beam on the recording layer of each disc.

However, it is a main trend that an optical pick-up apparatus comprises such constitution that is made to condense the light beam on the recording surface of different kinds of optical discs with a single objective lens in order to make it small-sized, light-weighted and low-cost.

A general constitution of such kind of an optical pic-up apparatus is shown in FIG. 11 and explained below.

FIG. 11(a) shows a schematic drawing in the case where a high density optical disc 1a having a substrate thickness of 0.6 mm is read and FIG. 11(b) shows a schematic drawing in the case where a standard density optical disc 1b having a substrate thickness of 1.2 mm is read.

Hereinafter, a constitution of an optical pick-up apparatus is explained referring to FIG. 11(a).

On the light path of a light beam emitted from a first light source 2 corresponding to the high density optical disc 1a, from the close side to the first light source 2 are disposed, in turn, a wavelength selection mirror 3, a beam splitter 4, a collimator lens 5 and a raising mirror 6, wherein the raising mirror 6 is disposed in such a manner as it opposes to the recording surface of the high density optical disc 1a. Between the high density optical disc 1a and the raising mirror 6 an actuator movable portion 7 is disposed. Here, a two-dotted chain line shows an axis A which connects the first light source 2 and the raising mirror 6. And a position perpendicular to the axis A and opposing to the wavelength selection mirror 3, a second laser light source 8 corresponding to the standard density optical disc 1b is disposed. Further, at a position perpendicular to the axis A and opposing to the beam splitter 4, a wavelength selection mirror 9 and a cylindrical lens 10 are disposed, and at a position where the cylindrical lens 10 condenses on a first photo detector 11 which the light beam reflected on the recording surface of the high density optical disc 1a enters is disposed. And, at a position opposing to the wavelength mirror 9, a cylindrical lens 12 and a second photo detector 13 are disposed in parallel with the axis A.

The wavelength selection mirror 3 and the wavelength selection mirror 9 are adapted to transmit the light beam emitted from the first light source 2 and to reflect the light beam emitted from the second light source 8, and the beam splitter 4 transmits the light beams from the light sources 2 and 8, and reflects the signal light beams reflected on the optical discs 1a and 1b to the photo detector 11 and 13. The collimator lens 5 is adapted to convert the light beam into a parallel light beam, and the raising mirror 6 is adapted to reflect the light beam which is transmitted the collimator lens 5 toward the vertical direction and to enter the actuator movable portion 7 by changing the light progressing direction.

On the actuator movable portion 7, an objective lens 14 and an opening limiting plate 15 are mounted, and the objective lens 14 is designed to have the most suitable opening diameter when the high density optical disc 1a is read. Since the opening limiting plate 15 is adapted to transmit the light beam emitted from the first light source 2 and has an aperture formed with a wavelength filter film 16 which cuts off the light beam emitted from the second light souce 8, the diameter of the light beam emitted from the second light source 8 can be limited. Therefore, when this limited light beam is transmitted the objective lens 14, the aperture is designed to have the most suitable opening diameter to read the standard density optical disc 1b.

And the cylindrical lenses 10 and 12 are rod-like lens, and give an astigmatism the light beam which enters the first photo detector 11 and the second photo detector 13. Further, the first photo detector 11 detects the signal light from the high density optical disc 1a and the second photo detector 13 detects the signal light from the standard density optical disc 1b.

The thus-constituted optical pick-up apparatus of the high density optical disc 1a will be explained.

The light beam emitted from the first light source 2 is transmitted the wavelength selection mirror 3 and the beam splitter 4 and progresses in the collimator lens 5 and is converted into parallel light beams having an equally widened angle with each other. The converted parallel light beams progress toward the high density optical disc 1a with the raising mirror 6 and is transmitted the opening limiting plate 15 and are condensed most suitably on the recording surface of the high density optical disc 1a with the objective lens 14.

And, the light beam reflected on the recording surface of the high density optical disc 1a becomes a signal light and traces the same path reversely, which, however, is branched toward the photo detector 11 through the beam splitter 4. Further, by being transmitted the wavelength selection mirror 9 and the rear cylindrical lens 10, the light beam is given with the astigmatism to be detected with the first photo detector 11.

Next, the reading operation of the standard density optical disc 1b is explained referring to FIG. 11(b).

The light beam emitted from second light source 8 is reflected on the wavelength selection mirror 3, and is transmitted the beam splitter 4 and is converted into a parallel light beam with the collimator lens 5. Then, the parallel light beam progresses toward the standard density optical disc 1b with the raising mirror 6. Further, since the light beam is cut-off with the wavelength filter film 16 of the opening limiting plate 15, the light beam of only a central portion can be transmitted the opening limiting plate 15. The light beam thus limited in the beam diameter is condensed on the recording surface of the standard density optical disc 1b with the objective lens 14.

And, the light beam reflected on the recording surface of the standard density optical disc 1b becomes a signal light, traces the same path reversely and is branched toward the photo detector 11 with the beam splitter 4.

Further, the light beam is reflected with the wavelength selection mirror 9 to the direction of the second photo detector 13, to be given with the astigmatism and is detected with the second photo detector 13.

Now, in the above conventional optical pick-up apparatus, since, in order to read different kinds of high density optical disc 1a and the standard density optical disc 1b, it is carried out to control the opening diameter of the objective lens 14 with the opening limiting plate 15 of the actuator movable portion 7, the following problems are arisen.

That is, when the standard density optical disc 1b is read, the light beam is cut-off with the wavelength filter film 16 of the opening limiting plate 15 and a light beam of only a sectional central portion can be transmitted the opening limiting plate 15, merely thereby, a beam spot to be condensed on the recording surface of the standard density optical disc 1b is apt to generate a wave front aberration, which influences the reading property of the recorded information.

In addition, in the above conventional optical pick-up apparatus, a small-sizing and a light-weighting are realized by condensing the light beam on different kinds of optical discs through a single objective lens. However, since the opening limiting plate 15 is provided, the number of parts is increased. Further, since the assembling time is increased, an increase in cost of an apparatus is invited, and since the opening limiting plate 15 is provided at the actuator movable portion 7, the increase in weight of the actuator movable portion 7 is invited, the property of the actuator will be deteriorated.

Accordingly, the present invention is made in the light of the above problem, without using an opening limiting plate, the diameter of the either light beam of two kinds of light beams is limited and each light beam is condensed most suitably on the recording surface of different kinds of optical discs with only one objective lens to provide a small-sized and low-cost optical pick-up apparatus.

SUMMARY OF THE INVENTION

In order to attain the above object, according to a first aspect of the present invention, in order to read two different kinds of first and second optical discs being different in substrate thickness and wavelength to be used, an optical pick-up apparatus comprises light sources which generate light beams respectively corresponding to said two kinds of optical discs, and a photo detector to detect signal lights reflected on said two optical discs, wherein one condenser lens condensing the light beam emitted from the light source corresponding to the first optical disc most suitably on the first optical disc is disposed, and said condenser lens condenses the light beam emitted from the light source corresponding to the second optical disc most suitably on the second disc by limiting the diameter of the light beam emitted from the light source corresponding to the second optical disc, and an opening limiting portion which changes the beam diffusion angle of the light beam emitted from the light source corresponding to the second optical disc is disposed between said light sources and said condenser lens.

According to a second aspect of the present invention, in the first aspect, said opening limiting portion consists of plano-concave lens having a plane portion and a concave portion, which is set slantwise to a light axis at a given angle, and on the plane surface which is a incident surface of the light beam, an optical filter film which reflects the light beam corresponding to the first optical disc and transmits the light beam corresponding to the second optical disc is formed, and on the concave surface an all-reflecting film which limits the beam diameter of the light beam corresponding to the second optical disc which enters from the plane surface is formed.

According to a third aspect of the invention, in the first aspect, said opening limiting portion comprises a piano concave lens, a plane glass adhered to the plane side thereof, which is set slantwise to a light axis at a given angle, on the non-adhered surface of the plane glass which is a light incident surface, an optical filter film which reflects the light beam corresponding to the first optical disc and transmits the light beam corresponding to the second optical disc is formed, and on the adhered surface of the plano-concave lens, a light absorption film for limiting the beam diameter of the light beam corresponding to the second optical disc, which enters from the non-adhered surface of the plano-concave lens, on the concave surface of the non-adhered surface of the plano-concave lens, an all-reflecting film which reflects inside the beam entered.

According to a fourth aspect of the present invention, in the second or third aspect, an optical filter film of the opening limiting portion transmits or reflects the light beam in accordance with the wavelength of the light beam.

According to a fifth aspect of the present invention, in the second or third aspect, the optical filter film of the opening limiting portion transmits or reflects the light beam in accordance with a polarization direction.

The present invention, by the above constitution, in order to condense the light beam most suitably on the second optical disc, the opening limiting portion to limit the beam diameter of the light beam is disposed between the first optical disc and the light source, so that, when the first optical disc is read, the light beam is condensed most suitably on the disc with the condenser lens. On the other hand, when the second optical disc is read, since the beam diameter is limited with the opening limiting portion, the light beam, which is even what corresponds to the second optical disc, is condensed most suitably on the disc with the condenser lens. Further, by changing the beam diffusion angle of the light beam emitted from the light beam corresponding to the second optical disc, the generation of the wave front aberration is restrained.

BRIEF DESCRIPTION OF THE DRAWINGS

FIGS. 5(a) 5(b) show outlines of the constitution of the first embodiment different from what is shown in FIG. 4 of the present invention.

FIG. 9 shows a graph indicating the wavelength-transmissivity property of the polarizing filter film.

EMBODIMENT

An embodiment of the optical pick-up apparatus of the present invention is explained referring to the attached drawings. Now, same signs used in the conventional art are used identically to the identical members in this embodiment and explanations thereof are omitted.

An optical pick-up apparatus of the present invention shown in FIG. 1(a) shows a case where a high density optical disc 1a is read and FIG. 1(b) shows a case where a standard density optical disc is read.

Figure 1:
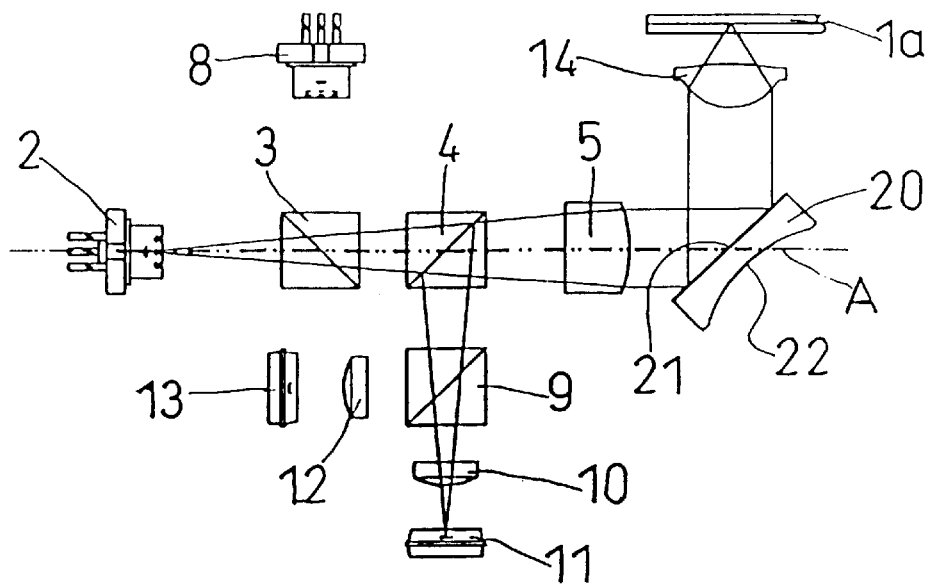
FIGS. 1(a)–1(b) shows outlines of a first embodiment of an optial pick-up apparatus of the present invention.
Figure 1:
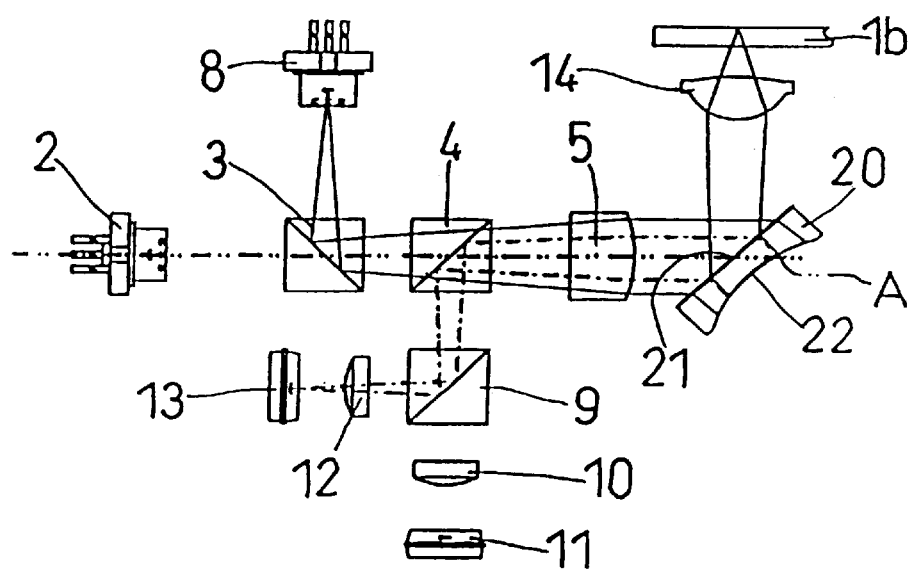

As shown in FIG. 1, the difference from the conventional optical pick-up apparatus resides in that, in order to read different kinds of optical discs 1a, 1b through a single objective lens 14, in place of the conventional raising mirror 6, an raising mirror 20 as an opening limiting portion is provided. Therefore, in the optical pick-up apparatus of the present invention, such constitution as the opening limiting plate 15 of the movable portion 7 of the actuator is not provided. For reference, the objective lens 14 as a condenser lens is designed in such an opening diameter as it is most suitable when the high density optical disc 1a is read as well as in the conventional.

Figure 2A:
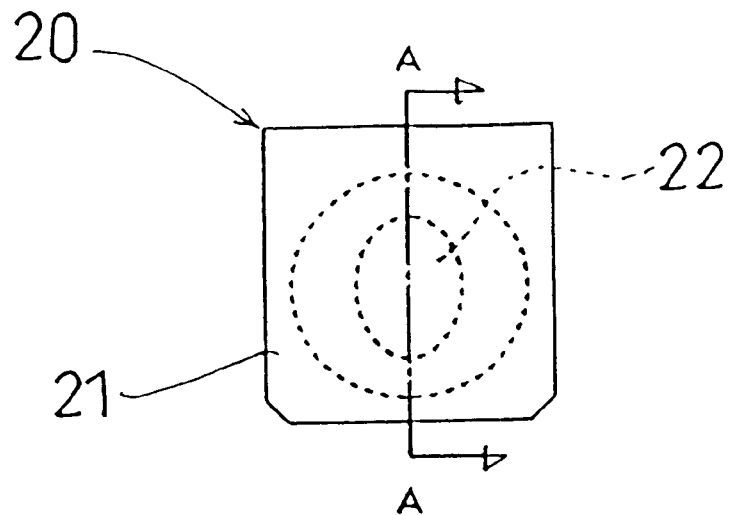
FIG. 2 shows an outlines of a raising mirror as a main portion of the present invention.
Figure 2B:
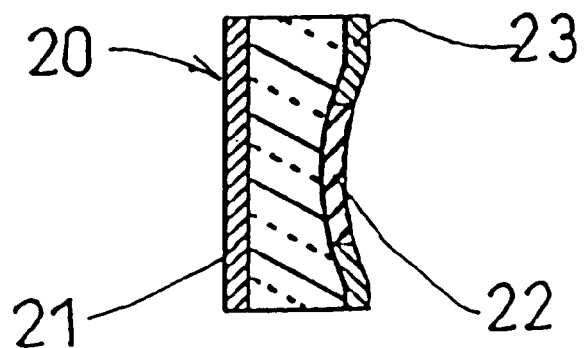

As shown in FIG. 2(b) which is a sectional view of A—A of FIG. 2(a) showing a front view of a raising mirror 20, the raising mirror 20 is consisted of a plane surface and a concave surface, the plane surface side thereof is covered with a wavelength filter film 21, an all-reflecting film 22 is formed at a centrally circulated area of the concave side thereof (FIG. 2(a)) for limiting the beam diameter of the light beam which enters from the plane side. And, the concave surface without the all-reflecting film 22 is covered with an anti-reflection film in order to prevent the not-reflected light beam from stray light, the anti-reflection film 23 may function like the above, and so it may be replaced with a light absorption material.

Figure 3:
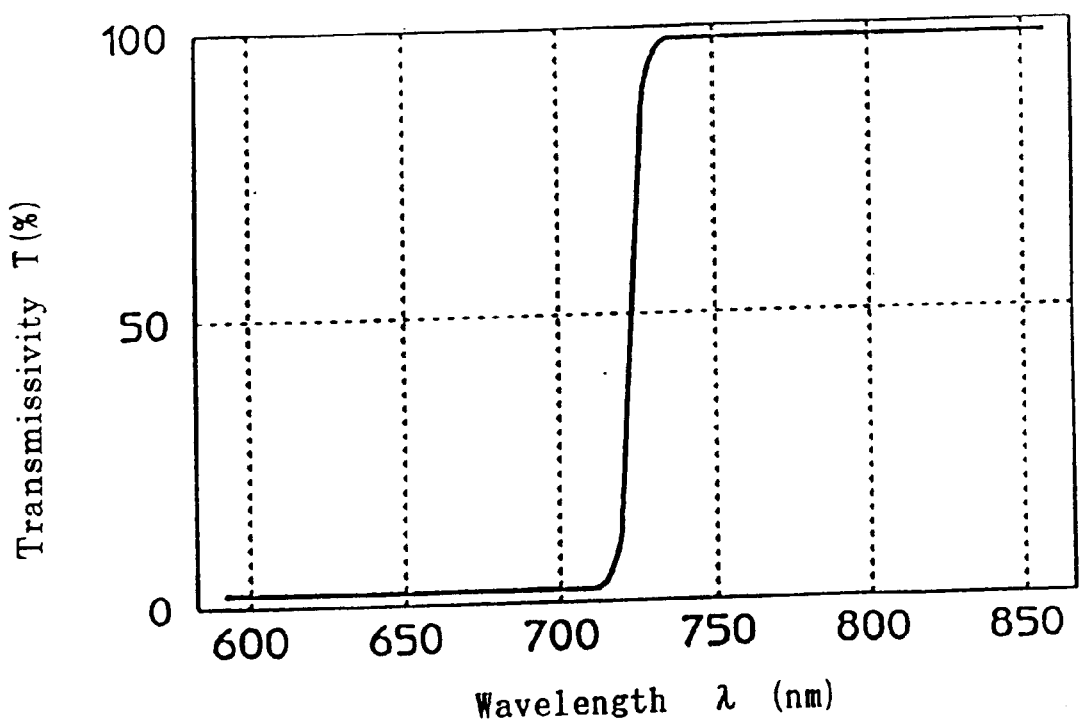
FIG. 3 shows a graph indicating a wavelength-transmissivity property of the wavelength filter film.

The wavelength filter film 21, which reflects approximately completely the light beam having wavelength of 650 nm (corresponding to a high density optical disc 1a) and transmits approximately completely the light beam having wavelength of 780 nm (corresponding to the standard density optical disc 1b), is a high-pass filter as shown in property graph of FIG. 3 explaining a wavelength filter film) and consists of a dielectric multilayer film.

And, the thickness and the curvature center of the plano-concave lens which constitutes the raising mirror 20 are designed in such a manner as the difference between the axis of the light beam which is reflected on the plane surface of the raising mirror 20 and the axis of the light beam which enters from the plane surface of the raising mirror 20 and is reflected on the concave surface of the raising mirror 20 is adapted to be within the tracking control of the actuator (not shown). Further, the configuration of the all-reflecting film 22 is designed in such a manner as it looks as a real circle viewing from the light axis, and its outer diameter is set in such a manner as the beam diameter of the reflected light beam is smaller than the opening diameter of the objective lens 14.

The above mentioned raising mirror 20, as shown in FIG. 1, is disposed on the axis A and is set slantwise at an angle of 45 degrees to the light axis as the plane side is the incident surface. Therefore, the incident angle of the light beam on the plane surface is 45 degrees, and the light beam corresponding to the high density optical disc 1a which is not transmitted the wavelength filter film 21, as shown in FIG. 1(a), is reflected vertically on the wavelength filter film 21 of the raising mirror 20 and is condensed most suitably on the recording surface of the high density optical disc 1a with the objective lens 14.

On the other hand, as shown in FIG. 1(b), when the standard oprical disc 1b is read, the light beam emitted from a second light source 8 reaches the raising mirror 20 at an angle of 45 degrees, enters the raising mirror 20 through the wavelength filter film 21, merely the central portion of the light beam is reflected vertically with the all-reflecting film 22 formed at the central portion of the concave side and converted into a dispersion light, and again enters the standard density optical disc 1b through the wavelength filter film 21. Then, since the light beam is throttled with the all-reflecting film 22, the light beam is condensed most suitably on the recording surface of the standard density optical disc 1b with the objective lens 14. Further, since the raising mirror 20 is disposed on the light axis slantwise, the beam diffusion angle of the reflected light beam is changed by being reflected on the all-reflecting film 22, and as a result, the generation of the wave front aberration is restrained. And, the light beam other than what is reflected with the all-reflecting film 22 after entering the raising mirror 20 is progressing in the anti-reflection film 23 and is absorbed.

Figure 4:
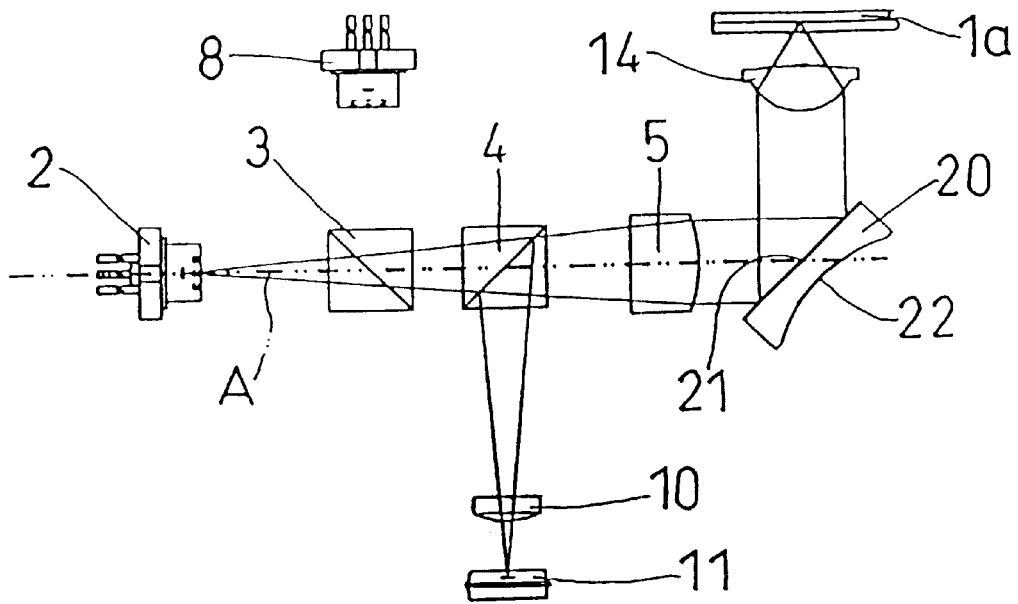
FIGS. 4(a)–4(b) show outlines of the constitution of the first embodiment different from what is shown in FIG. 1 of the present invention.
Figure 4:
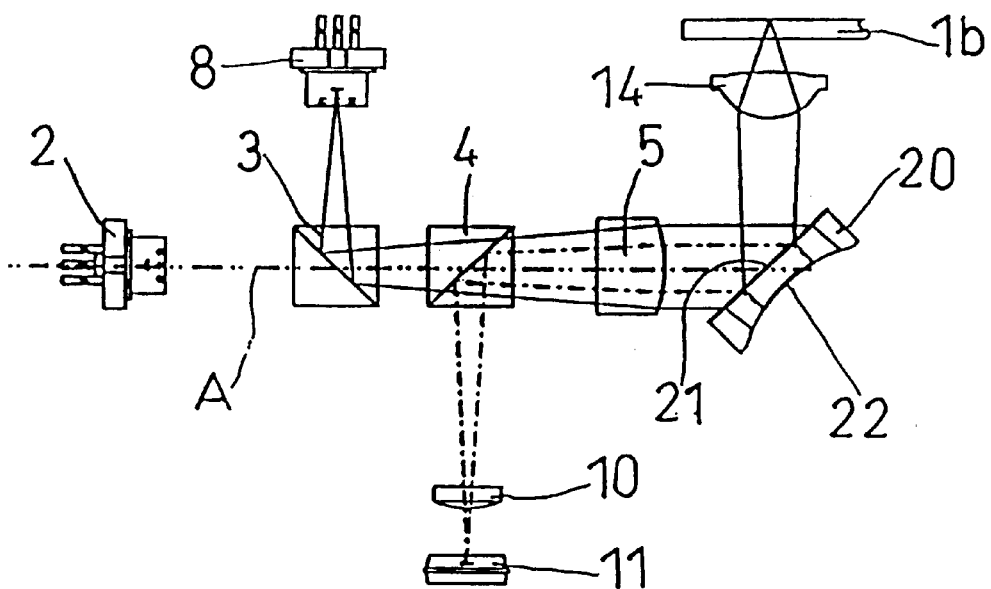

Further, in the optical pick-up apparatus of the present invention, since the distance from the collimator lens 5. to the first photo detector 11 and the distance from the collimator lens 5 to the second photo detector 13 is identical, as shown in FIG. 4, the optical pick-up apparatus may be constituted in such a manner as having a single photo detector 11 which detects the reflected light from the high density optical disc 1a and the standard density optical disc 1b. If constructed as such, since it does not need the wavelength selection mirror 9, merely one cylindrical lens 10 may be sufficient, so that the number of parts is reduced and the productivity is improved in low cost.

Further, in place of the first light source 2 and the second light source 8, as shown in FIG. 5, the optical pick-up apparatus may be constituted so as to use the first laser module 24 and the second laser module 25 which are built in a photo detectors. The first laser module 24 and the second laser module 25 are built in with a semi-conductor laser and the optical detecting system for detecting the signal light from the optical discs 1a and 1b, so that, the optical pick-up apparatus can detect the signal light from the optical discs 1a and 1b without the photo detectors 11 and 13. Accordingly, the beam splitter 4, the wavelength selection mirror 9 and the cylindrical lenses 10 and 12 may not be necessary. If the optical pick-up apparatus is constructed like this, the number of the optical parts. can be greatly omitted, the assembling time is reduced and, so that the productivity is improved while saving the producing cost. Further, in place of the raising mirror 20 having the opening limiting function, a raising mirror 26 may be used as shown in FIG. 6 and explained hereinafter.

Figure 6A:
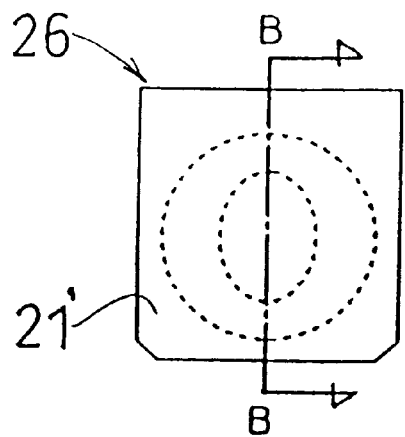
FIGS. 6(a) 6(b) show outlines of the raising mirror as different from what is shown in FIG. 2.
Figure 6B:
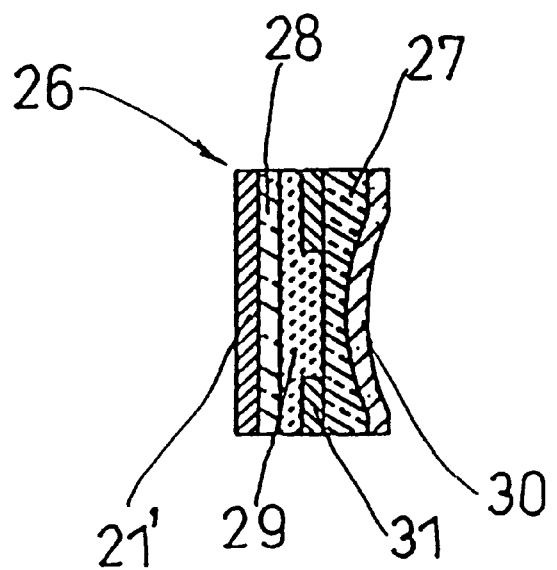

That is, as shown in FIG. 6(b) which shows a B—B section of a front view of FIG. 6(a), the raising mirror 26 is a unitary structure which is adhered a plane glass 28 to the plane surface of the plano-concave lens 27 with adhesives 29, and a wavelength filter film 21' having a wavelength-transmissivity property shown in FIG. 3 is formed on the plane glass 28. And, on the whole concave surface of the plano-concave lens 27, an all-reflecting film 30 for reflecting the light beam is provided.

Further, by limiting the beam diameter of the light beam progressed in the raising mirror 26, so as to obtain the throttling function, on the plane surface side of the plano-concave lens 27, a light absorption film 31 is formed outside of the circular area of the central portion of the plano-concave lens 27.

Since the raising mirror 26, as well as the raising mirror 20, is set slantwise at an angle of 45 degrees to the light axis, the circular area (throttled shape) without the light absorption film 31, as well as that of the raising mirror 20, is designed in such a manner as it is an almost circle viewing from the light axis, and its outer diameter is set in such a manner as the beam diameter of the transmitted light beam is smaller than the opening diameter of the objective lens 14.

Figure 7A:
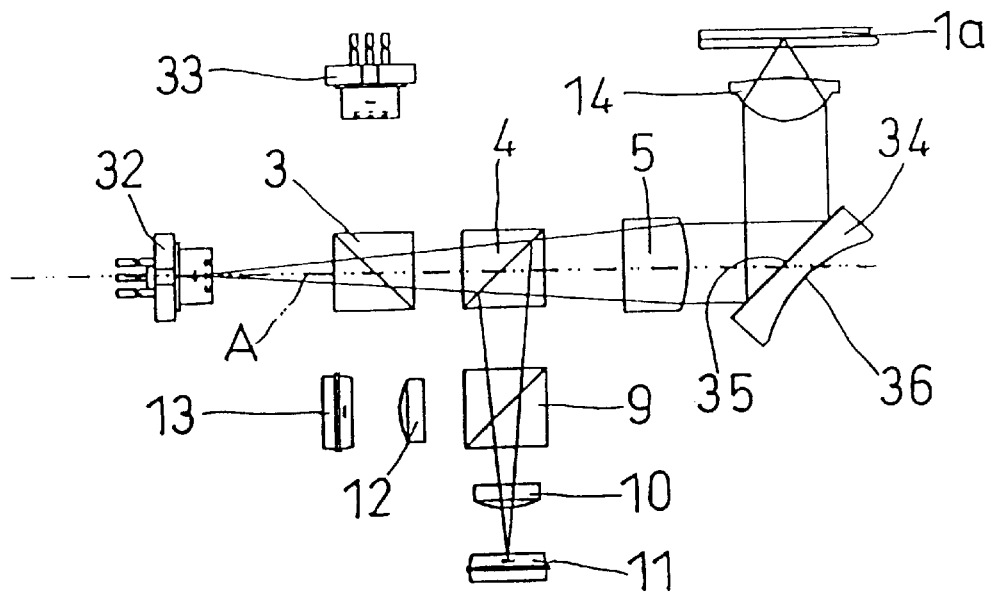
FIGS. 7(a) 7(b) show outlines of a second embodiment of an optical pick-up apparatus of the present invention.
Figure 7B:
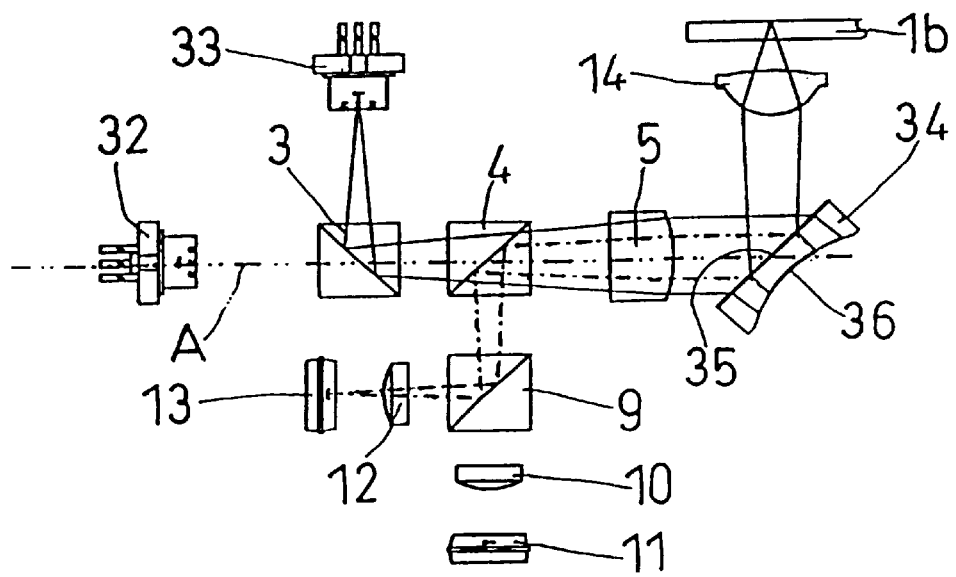

Subsequently, the second embodiment of the present invention will be explained referring to FIGS. 7–10. FIG. 7(a) shows the case where the high density optical disc 1a is read and FIG. 7(b) shows the case where the standard density optical disc is read.

As shown in FIG. 7, the first light source 32 emits a P-polarized light beam of wavelength of 650 nm and the second light source 33 emits a S-polarized light beam of wavelength of 780 nm. And, the wavelength selection mirror 3 and the wavelength selection mirror 9 transmit the light beam of wavelength of 650 nm emitted from the first light source 32 and reflect the light beam of wavelength of 780 nm emitted from the second light source 33 and the beam splitter 4 is translucent to the light beams emitted from the first light source 32 and the second light source 33 and branches the signal light reflected on the recording surfaces of the optical discs 1a and 1b to the photo detectors 11 and 13. For reference, the objective lens 14 is designed to have the most suitable opening diameter when the high density optical disc 1a is read.

Figure 8A:
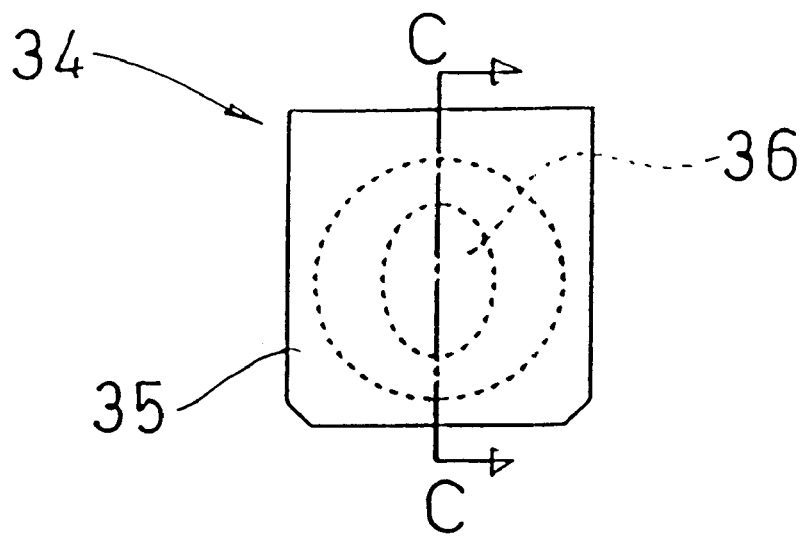
FIGS. 8(a) 8(b) show outlines of the raising mirror as different from what is shown in FIG. 6.
Figure 8B:
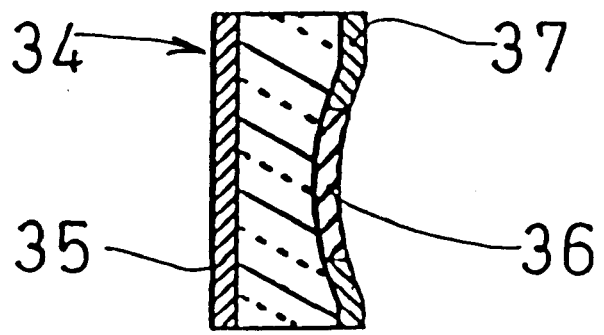

Further, the raising mirror 34 which reflects the light beam converted into parallel light with the collimator lens 5 toward the vertical direction is disposed on the light axis A. The raising mirror 34 is, as shown in FIG. 8(b) of C—C in section of a front view shown in FIG. 8(a), consisted of a plano-concave lens having a plane surface and a concave surface. The plane surface side is covered with a polarizing filter film 35 and the concave surface side is formed with an all-reflecting film 36 at a circular area of the central portion (FIG. 8(a)). And, the concave surface without the all-reflecting film 36 is covered with an anti-reflection film 37 in order to prevent the not-reflected light beam with the all-reflecting film 36 from stray light. For reference, in place of the anti-reflection film 37, a light absorption film may be sufficient if it serves above function.

The polarizing filter film 35, as shown in FIG. 9 showing a polarizing filter film-wavelength transmissivity property, reflects the light beam of wavelength of 650 nm as a P-polarized light almost completely, and transmits the light beam of wavelength of 780 nm as a S-polarized light almost completely. Accordingly, the light beam emitted from the first light source 32 is reflected almost completely and the light beam from the second light source 33 is transmitted almost completely to enter the raising mirror 34. For reference, such a polarizing filter film 35 consists of a dielectric multilayer film.

Now, the thickness and the curvature center of the plano-concave lens which constitutes the raising mirror 34 are designed in such a manner as the difference between the axis of the light beam being reflected on the plane surface of the raising mirror 34 and the axis of the light beam entering from the plane surface of the raising mirror 34 and being reflected on the concave surface of the raising mirror 34 is adapted to be within the tracking control of the actuator (not shown). Further, the configuration of the all-reflecting film 36 is designed in such a manner as it looks as a real circle viewing from the light axis, and its outer diameter is set in such a manner as the diameter of the reflected light beam is smaller than the opening diameter of the objective lens 14.

By disposing the thus constituted raising mirror 34, as well as in the first embodiment, the light beam corresponding to the high density optical disc 1a is reflected on the polarizing filter film 35, and on the other hand, the light beam corresponding to the standard density optical disc 1b is transmitted the polarizing filter film 35 and throttled with the all-reflecting film 36 formed on the concave surface, so that these light beams are condensed most suitably on the recording surfaces of different kinds of optical discs 1a and 1b.

Figure 10A:
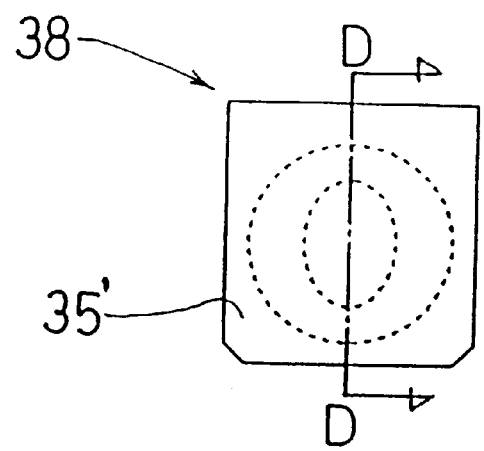
FIGS. 10(a) 10(b) show outlines of the raising mirror as different from what is shown in FIG. 8.
Figure 10B:
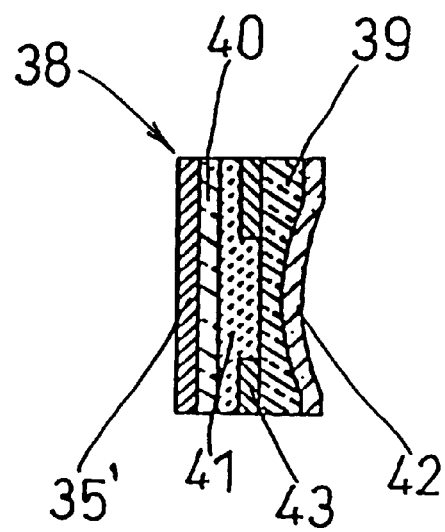
Figure 11A:
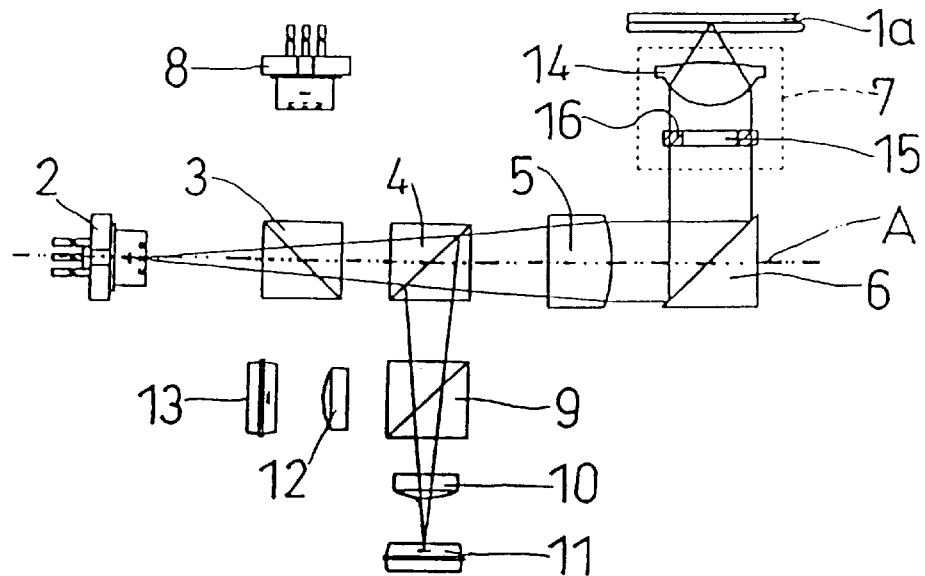
FIGS. 11(a) and 11(b) are schematic drawings of conventional optical pick-up apparatus.
Figure 11B:
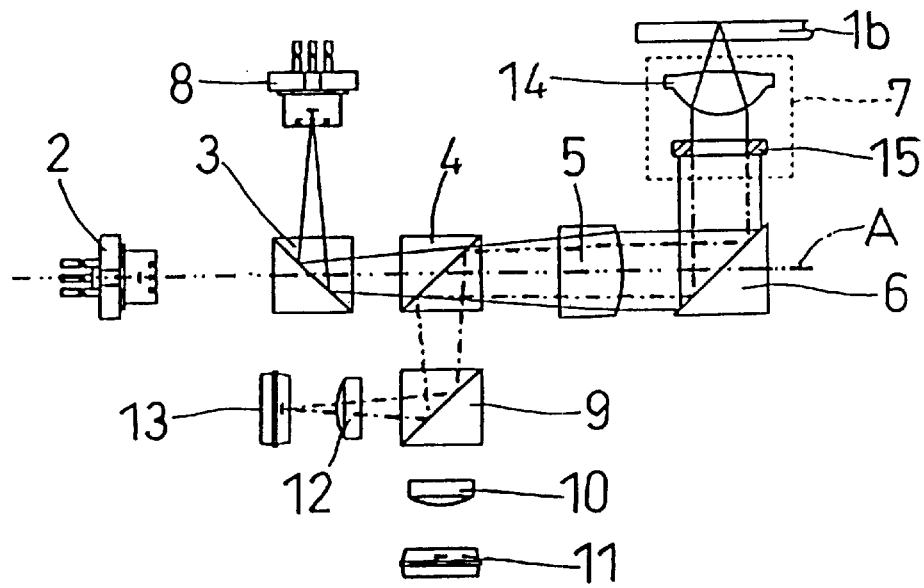

In place of the raising mirror 34 having opening limiting function, a raising mirror 38 shown in FIG. 10 may be used. That is, as shown in FIG. 10(b) of D—D in section of a front view of the raising mirror 38 of FIG. 10(a), the raising mirror 38 is a unitary structure which is adhered a plane glass 40 to the plane surface of the plano-concave lens 39 with adhesives 41, and a wavelength filter film 35' having a wavelength-transmissivity property shown in FIG. 9 is formed on the plane glass 40. And, on the whole concave surface of the plano-concave lens 27, an all-reflecting film 42 for reflecting the light beam is provided and as the raising mirror 38 has a throttling function, a light absorbing film 43 is formed outside of the circular area of the central portion of the plane side of the plano-concave lens 39. The geometry of the aperture (i.e. effective area of the all-reflecting film 42) is identical with the one of the above raising mirrors 20, 26 and 34.

In the second embodiment of the present invention, although the light sources 32 and 33 are different in its polarization direction each other, light sources of the same polarization direction may be used as, on the light path between either of the light sources and the wavelength selection mirror 3, a ½ wavelength plate may be disposed and the polarization direction is changed with the ½ wave length plate. Further, in the case where light sources having a same polarization direction are used, either of the light sources may be set by turning at an angle of 90 degrees without using the above ½ wavelength plate to differentiate the polarization direction.

For reference, even in the second embodiment of the present invention, as well as in the first embodiment, in order to condense the light beam most suitably on the recording surfaces of different kinds of optical discs 1a and 1b, since one light beam is reflected on the plane surface of the raising mirror 34 to raise and the other light beam is reflected on the concave surface of the raising mirror 34 to raise, as the optical pick-up apparatus explained referring to FIGS. 4 and 5 in the first embodiment, the number of the optical parts can be omitted, the assembling time is reduced and the productivity is improved while saving the producing cost by using a structure of a single photo detector or using a structure of a laser module.

The followings are the effects of each aspect of the present invention.

According to the first aspect of the present invention, since a single condenser lens which condenses the first light beam most suitably on the first optical disc is disposed, the second light beam is condensed most suitably on the second optical disc by limiting the beam diameter of the second light beam and the opening limiting portion for changing the beam diffusion angle of the second light beam is disposed between the condenser lens and the light source, the light beam can be condensed most suitably on the respective recording surface of different kinds of the optical discs with a single condenser lens and a generation of a wave front aberration is restrained and the reading property is improved.

According to the second aspect of the present invention, the opening limiting portion which is set slantwise to a light axis at a given angle is a plano-concave lens, on the plane surface which is the incident surface of the light beam, a filter film which reflects the first light beam and transmits the second light beam is formed, and since, on the concave surface, all-reflecting film for limiting the beam diameter of the second light beam emitted from the plane surface is formed, the first and second light beams are condensed most suitably on respective recording surfaces of each optical disc and the generation of the wave front aberration is restrained by changing the beam diffusion angle of the second light beam, and further, since by changing the progressing direction of the light beam, it can be used as a means of changing direction, as a result, small-sized and low-cost optical pick-up apparatus can be provided.

According to the third aspect of the present invention, the opening limiting portion which is set slantwise to the light axis at a given angle is a plano-concave lens and a plane glass adhered to the plane surface thereof, and on the plane surface, an optical filter film for reflecting the first light beam and transmitting the second light beam is formed, and on the adhered surface of the plano-concave lens, a light absorption film for limiting the beam diameter of the second light beam emitted from the non-adhered surface of the plane glass is formed, and further, an all-reflecting optical film for reflecting the second light beam inside is formed on the concave surface, thereby, the first and second light beams are condensed most suitably on each optical disc and the generation of the wave front aberration is restrained by changing the beam diffusion angle of the second light beam, and changing the progressing direction of the light beam can be used as a means of changing direction, and a reduction of the parts is possible, as a result, small-sized and low-cost optical pick-up apparatus can be provided.

Finally, even in changing the constitution of the filter film of the opening limiting portion in various ways as well as in the fourth and fifth aspects, the above mentioned effects are available.

What is claimed is:

1. An optical pick-up apparatus, to read two different kinds of first and second optical discs being different in substrate thickness and wavelength to be used, comprising:

light sources which generate light beams respectively corresponding to said two kinds of optical discs;

a photo detector to detect signal lights reflected on said two optical discs; and an opening limiting portion set slantwise to a light axis at a given angle, wherein one condenser lens condensing the light beam emitted from the light source corresponding to the first optical disc most suitably on the first optical disc is disposed, said opening limiting portion includes a plano-concave lens formed with a plane surface and a concave surface and is disposed between said condenser lens and said light sources, a beam diameter and a beam diffusion angle of the light beam emitted from the light source corresponding to the second optical disc are limited by said opening limiting portion, and said condenser lens condenses the limited light beam most suitably on the second optical disc.

2. An optical pick-up apparatus according to claim 1, wherein an optical filter film which reflects the light beam corresponding to the first optical disc and transmits the light beam corresponding to the second optical disc is formed on the plane surface which is an incident surface of the light beam, and an all-reflecting film which limits the beam diameter of the light beam corresponding to the second optical disc which enters from the plane surface is formed on the concave surface.

3. An optical pick-up apparatus according to claim 2, wherein the optical filter film of the opening limiting portion transmits or reflects the light beam in accordance with the wavelength thereof.

4. An optical pick-up apparatus according to claim 2, wherein said optical filter film transmits or reflects the light beam in accordance with a polarization direction thereof.

5. An optical pick-up apparatus, to read two different kinds of first and second optical discs being different in substrate thickness and wavelength to be used, comprising:

light sources which generate light beams respectively corresponding to said two kinds of optical discs;

a photo detector to detect signal lights reflected on said two optical discs; and an opening limiting portion set slantwise to a light axis at a given angle, wherein one condenser lens condensing the light beam emitted from the light source corresponding to the first optical disc most suitably on the first optical disc is disposed, said opening limiting portion comprises a plano-concave lens formed with a plane surface and a concave surface, and a plane glass adhered to the plane surface side thereof, and is disposed between said condenser lens and said light sources, a beam diameter and a beam diffusion angle of the light beam emitted from the light source corresponding to the second optical disc are limited by said opening limiting portion, and said condenser lens condenses the limited light beam most suitably on the second optical disc.

6. An optical pick-up apparatus according to claim 5, wherein an optical filter film which reflects the light beam corresponding to the first optical disc is formed on the non-adhered surface of the plane glass which is a light incident surface, a light absorption film for limiting the beam diameter of the light beam corresponding to the second optical disc, which enters from the non-adhered surface of the plane glass, is formed on the adhered surface of the plano-concave lens, and an all-reflecting film which reflects the incident light beam inside is formed on the concave surface of the plano-concave lens, that is the non-adhered surface.

7. An optical pick-up apparatus according to claim 6, wherein the optical filter film of the opening limiting portion transmits or reflects the light beam in accordance with the wavelength thereof.

8. An optical pick-up apparatus according to claim 6, wherein said optical filter film transmits or reflects the light beam in accordance with a polarization direction thereof.

* * * * *